United States Patent [19]
Krabbenhoft et al.

[11] Patent Number: 5,162,458
[45] Date of Patent: Nov. 10, 1992

[54] SOLVENT RESISTANT LINEAR POLYCARBONATE COMPOSITIONS

[75] Inventors: Herman O. Krabbenhoft, Scotia; Eric J. Pearce, Maryland; Daniel J. Brunelle, Scotia; David K. Bonauto, New York, all of N.Y.

[73] Assignee: General Electric Company, Schenectady, N.Y.

[21] Appl. No.: 578,375

[22] Filed: Sep. 7, 1990

[51] Int. Cl.$^5$ ............................................. C08L 69/00
[52] U.S. Cl. ..................................... 525/462; 525/469
[58] Field of Search ................................. 525/462, 469

[56] References Cited

U.S. PATENT DOCUMENTS

| | | | |
|---|---|---|---|
| 4,186,154 | 1/1980 | Binsack | 525/461 |
| 4,920,200 | 4/1990 | Brunelle et al. | 528/204 |

FOREIGN PATENT DOCUMENTS 109591  9/1977  Japan .

*Primary Examiner*—James J. Seidleck
*Assistant Examiner*—David Buttner
*Attorney, Agent, or Firm*—William H. Pittman; James C. Davis, Jr.

[57] ABSTRACT

Polymeric compositions are described which result from blending a mixture comprising: (A) at least one amorphous polycarbonate; (B) at least one linear polycarbonate oligomer containing hydroquinone carbonate structural units; and (C) at least one polycarbonate formation catalyst.

The polymeric compositions have particular application in the preparation of shaped articles for use in environments characterized by the presence of solvents, solvent vapors, and/or potential for fire conditions. Methods for increasing the solvent and flammability resistance of amorphous polycarbonates are also described.

19 Claims, No Drawings

SOLVENT RESISTANT LINEAR POLYCARBONATE COMPOSITIONS

FIELD OF THE INVENTION

This invention relates generally to methods for increasing the solvent and flammability resistance of amorphous polycarbonates and to polymeric compositions resultant from blending a mixture comprising an amorphous polycarbonate resin, a polycarbonate oligomer, and a polycarbonate formation catalyst.

BACKGROUND OF THE INVENTION

Polycarbonates are well-known resins which have good property profiles, particularly with respect to impact resistance, electrical properties, optical clarity, dimensional stability and the like. Polycarbonates are used in applications requiring extreme toughness, transparency, resistance to burning, and maintenance of useful engineering properties over a wide temperature range. Typical applications include: bubble helmets for astronauts, canopies for supersonic aircraft, furnishings for commercial aircraft, break-resistant windows, transparent bullet-resistant laminates, impact-resistant lenses, combination electrical insulation and mechanical housings for appliances, automotive instrument panels, and the like.

One polycarbonate resin that has been used successfully in such environments is based on bisphenol A ("BPA"). The relevant art prior to BPA-polycarbonates and the subsequent development of this material as an engineering resin is reviewed in H. Schnell, *Chemistry and Physics of Polycarbonates*, Wiley-Interscience, New York (1964) and K. Johnson, *Polycarbonates Recent Developments*, Noyes Beta Corp., Parkridge, N.J. (1970).

While BPA-polycarbonate provides significant benefits, this resin and related amorphous polycarbonates have certain disadvantages. Most notably, the resistance of amorphous polycarbonates to organic solvents is rather limited The tendency of organic solvents to crystallize, craze, crack or mar the surface of objects made from such polycarbonates naturally limits their application. For example, tensile strains may readily be "frozen in" to polycarbonate parts during fabrication by injection molding and, when compounded with stresses encountered in service, result later in crazing on exposure to unfavorable environments. The presence of solvents or solvent vapors in such environments may alter threshold conditions for crazing to the point where parts under mechanical stress will fail. Therefore, environmental conditions as well as stresses to be encountered in fabrication and in service must be considered carefully in designing for polycarbonates.

There have been a number of attempts to improve the solvent resistance of BPA-polycarbonate resins. One effort involved the use of a cross-linking agent, as disclosed, for example, in U.S. Pat. Nos. 4,604,434, 4,636,559, 4,701,538, and 4,767,840. This technique is often effective, but difficulties are sometimes encountered by reason of swelling of the cross-linked polycarbonate in the presence of organic liquids, and loss of ductility with increasing levels of cross-linking agents.

Another limitation of certain BPA-polycarbonates is flame resistance. Although polycarbonate resins will normally merit the rating of "self-extinguishing" according to ASTM Method D 635, they will often receive poorer ratings under UL-94 testing procedures.

Thus, there continues to be a need for BPA-polycarbonates that have increased solvent and flame resistance in combination with high impact strength and conventional processability.

SUMMARY OF THE INVENTION

The present invention addresses the foregoing and other limitations by providing polymeric compositions resultant from blending a mixture comprising: (A) at least one amorphous polycarbonate; (B) at least one linear polycarbonate oligomer containing hydroquinone carbonate structural units; and (C) at least one polycarbonate formation catalyst. The present invention is based on the discovery that the solvent and flammability resistance of an amorphous polycarbonate are increased by blending therewith an effective amount of a linear polycarbonate oligomer containing hydroquinone structural units in the presence of a polycarbonate formation catalyst.

Accordingly, the present invention provides a method for increasing the solvent and flame resistance of amorphous polycarbonates. Also provided is a novel class of solvent and flame resistant polycarbonate polymeric compositions. The polymeric compositions have particular application in the preparation of shaped articles for use in environments characterized by the presence of solvents, solvent vapors, and/or potential for fire conditions.

DETAILED DESCRIPTION

In one of its aspects, the present invention is directed to polymeric compositions resultant from blending a mixture comprising:

(A) up to about 80 percent by weight of at least one amorphous polycarbonate;

(B) at least about 20 percent by weight of at least one linear polycarbonate oligomer comprising carbonate structural units of the following formulae (I) and (II):

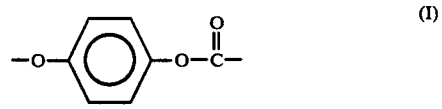

and

wherein in formula (II) $A^1$ is a divalent group represented by the following formulae (III) or (IV):

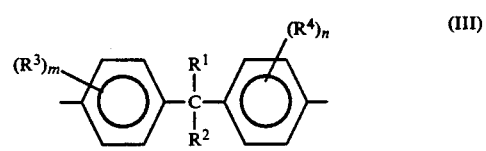

or

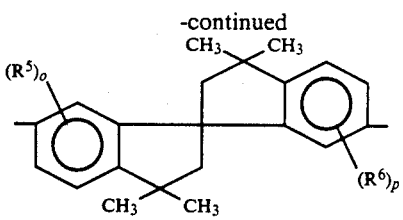

(IV)

wherein in formula (III) each of $R^1$ and $R^2$ independently is a linear or branched alkyl group, and in formulae (III) and (IV) each of $R^3$, $R^4$, $R^5$ and $R^6$ independently is a linear or branched alkyl group, or is a halogen atom; m and n are independently 0–4, and o and p are independently 0–3; and wherein at least about 30 mole percent of the carbonate structural units in said oligomers have formula (I); and (C) at least about 0.01 mole percent based on the moles of carbonate structural units in the mixture of at least one polycarbonate formation catalyst It is not certain whether any or all of the components (A), (B), and (C) used to prepare the polymeric compositions of the present invention interact chemically upon blending. Therefore, the present invention contemplates compositions comprising said components and any reaction products thereof, as well as optional components as described hereinafter.

1. Amorphous Polycarbonate Resins

The term "amorphous" when used in conjunction with the polycarbonate resins of component (A) is intended to describe polycarbonates that are substantially devoid of crystallinity or stratification at processing temperatures up to about 180° C. Such materials may possess some order, but it is insufficiently developed to result in loss of transparency or to be observed in routine x-ray crystallography spectra. Such polycarbonates, however, may become crystallized to some degree by prolonged heating at elevated temperatures or by exposure to solvents such as acetone, as by immersion.

The amorphous polycarbonates (A) are available commercially and can also be prepared by several methods known in the art including those set forth in W. Christopher, et al., *Polycarbonates*, Reinhold Publishing Corporation, New York (1962). For example, they may be produced by the Schotten-Baumann reaction of phosgene with a diol in the presence of an appropriate hydrogen chloride acceptor or by a melt transesterification reaction between the diol and a carbonate ester. In the former, phosgene reacts directly with the diol to produce a polymer in a solution. The reaction may be run by employing an acid acceptor such as pyridine or triethylamine, either in solution in a solvent such as methylene chloride or interfacially in a mixture of such a solvent and water. The polymer may be recovered as a solution after aqueous washes to remove the acid acceptor which has been neutralized or is present in excess. In transesterification, a diphenyl carbonate reacts with the selected diol to give a phenol and a molten solvent-free Any number of diols including aliphatic, cycloaliphatic and aromatic dihydroxy compounds may be used in the above processes. Suitable aromatic dihydroxy compounds include, for example, the bis(monohydroxyaryl)alkanes and the bis(monohydroxyaryl) sulphones such as:

2,2-Bis(3,5-dichloro-4-hydroxyphenyl)propane
2,2-Bis-(4-hydroxyphenyl)propane (bisphenol A)
2,2-Bis-(4-hydroxyphenyl)pentane
2,4'-dihydroxydiphenylmethane
Bis(2-hydroxyphenyl)methane
Bis(4-hydroxyphenyl)methane
Bis(4-hydroxy-5-nitrophenyl)methane
1,1-Bis(4-hydroxyphenyl)ethane
3,3-Bis(4-hydroxyphenyl)pentane
4,4'-Dihydroxybiphenyl
2,6-Dihydroxynaphthalene
Bis(4-hydroxyphenyl) sulfone
Bis(3,5-diethyl-4-hydroxyphenyl) sulfone
2,2-Bis-(3,5-dimethyl-4-hydroxyphenyl)propane
2,4'-Dihydroxydiphenyl sulfone
5-Chloro-2,4'-dihydroxydiphenyl sulfone
Bis(4-hydroxybiphenylyl)sulfone
4,4'-Dihydroxydiphenyl ether
4,4'Dihydroxy-3,3'-dichlorodiphenyl ether
4,4'Dihydroxy-2,5-dihydroxydiphenyl ether
2,2-Bis(3,5-dibromo-4-hydroxyphenyl)propane.

Suitable aliphatic diols include, for example, ethylene glycol, diethylene glycol, triethylene glycol, polyethylene glycol, 1,3-propanediol, 1,3-butanediol, 1,4-butanediol, 2-methyl-1,3-propanediol, 1,5-pentanediol, 2-ethyl-1,3-propanediol, 1,6-hexanediol, 1,8-octanediol, 1-ethyl-1,3-hexanediol, 1,10-decanediol, and the like.

Suitable cycloaliphatic dihydroxy compounds include, for example, 1,4-cyclohexanediol, 1,2-cyclohexanediol, 2,2-(4,4'-dihydroxy-dicyclohexylene)-propane, 2,6-dihydroxydecahydronaphthalene, the corresponding bis-alkoxylated aromatic dihydroxy compounds thereof, and the like.

For the purposes of the invention, it is also possible to utilize polycarbonates (A) prepared by copolymerization of two or more of the above diols or terpolymerization of the above diols. Amorphous copolyester carbonates such as those disclosed in U.S. Pat. Nos. 4,238,597 and 4,506,065, as well as amorphous branched polycarbonates such as those disclosed in U.S. Pat. No. 3,544,514 may also be used as component (A) of this invention.

In one embodiment the amorphous polycarbonate (A) consists essentially of carbonate structural units of the following formula (V):

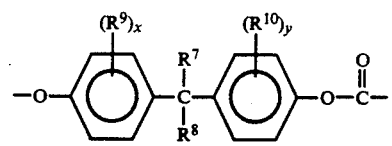

(V)

wherein each of $R^7$ and $R^8$ is independently a linear or branched alkyl group, each $R^9$ and $R^{10}$ is independently a linear or branched alkyl group, or is a halogen atom, and x and y are independently 0–4.

For example, such structural units may be derived from monomers including bisphenol A, 3,3',5,5'-tetrabromobisphenol A, 3,3',5,5'-tetrachlorobisphenol A and 3,3',5,5'-tetramethylbisphenol A.

The weight average molecular weight of the amorphous polycarbonates (A) is generally within the range of about 20,000 to about 80,000. Usually, the polycarbonates (A) will have a weight average molecular weight within the range of about 40,000 to about 60,000 (as determined by gel permeation chromatography relative to polystyrene). In addition, it is preferred in one embodiment that the polycarbonates (A) are homopolymers. For example, homopolymeric BPA-polycarbonates such as GE's Lexan® polycarbonates having a number average molecular weight (relative to polystyrene) of about 20,000 to about 30,000 are particularly preferred.

2. Linear Polycarbonate Oligomers

The polymeric compositions of the present invention are also prepared by incorporating at least about 20 percent by weight of at least one linear polycarbonate oligomer (B) comprising structural units of the formulae (I) and (II). The oligomers (B) have an overall linear structure, apart from the carbocyclic rings present in formulae (I)–(IV). They include oligomers having degrees of polymerization (i.e., average number of monomer units per oligomer molecule) from 3 to about 30 and preferably to about 20, with a major proportion being up to about 8 and a still larger proportion up to about 10. Usually mixtures of oligomers having varying degrees of polymerization will be employed as component (B).

An essential feature of the oligomers (B) is the presence of hydroquinone ("HQ") carbonate structural units (i.e., units of formula (I)) in amounts of at least about 30 mole percent. Hydroquinone carbonate levels of at least about 60 mole percent are preferred. Most often, the oligomers (B) contain hydroquinone units in amounts of about 65 mole percent.

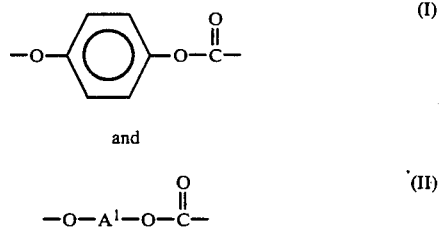

Also present in the oligomers (B) of this invention are carbonate units of formula (II). In that formula, $A^1$ may be a divalent bisphenol group of formula (III), in which each of $R^1$ and $R^2$ is an alkyl group as defined. Most often, both $R^1$ and $R^2$ are methyl.

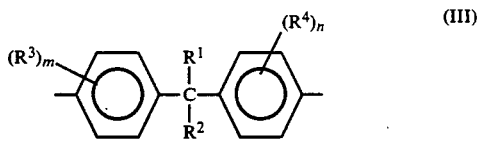

The $R^3$ and $R^4$ groups may be alkyl or halo as defined, and may be present in quantities up to 4 per aromatic ring. The values of m and n are usually each 0 or 2, and each $R^3$ or $R^4$ group (when present) is usually methyl or bromo. Thus, the divalent groups of formula (III) are derived from bisphenols known in the art, especially bisphenol A or 2,2-bis(4-hydroxyphenyl)propane.

The divalent $A^1$ groups may also have formula (IV); i.e., they may be derived from spirobiindane bisphenols which may contain $R^5$ and $R^6$ substituents as previously defined, up to 3 such and $R^6$ substituents as previously defined, up to 3 such substituents being present per aromatic ring. The preferred spirobiindane bisphenol is the unsubstituted 6,6'-dihydroxy-3,3,3'3'-tetramethylspiro(bis)indane.

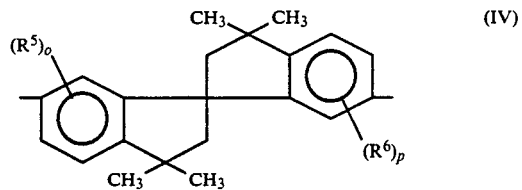

The oligomers (B) may be prepared by a variety of well-known processes including:

interfacial polymerization as set forth in F. Millich and C. Carraher, Jr., eds., *Interfacial Synthesis*, Vol. II, Marcel Dekker, Inc., New York (1977), Chapt. 13; and melt transesterification as described in H. Schnell, *Chemistry and Physics of Polycarbonates*, Wiley-Interscience, New York (1964), (Section III, 3, A, 4).

In one embodiment, the oligomers (B) are obtained by purifying a mixture of carbonate oligomers which contain both cyclic and linear oligomers (hereinafter "crude cyclics"). The crude cyclics may be prepared by contacting: (i) a mixture of hydroquinone bischloroformates and bischloroformates of a dihydroxyaromatic compound of the formula HO-$A^1$-OH (wherein $A^1$ is as defined above) with, (ii) at least one oleophilic aliphatic or heterocyclic tertiary amine, and (iii) an aqueous base comprising an alkali or alkaline earth metal hydroxide or carbonate solution, in (iv) a substantially non-polar organic liquid which forms a two-phase system with water. The bischloroformates are preferably maintained in low concentration wherein the molar ratio of said amine to said bischloroformates is about 0.06–2.0:1 and the molar ratio of said base to said bischloroformates is at least about 1.4:1. The linear oligomers (B) may be obtained by purification of the crude cyclics such as rapid stirring in acetone followed by vacuum filtration. For a more detailed description of the preparation and isolation of cyclic polycarbonate oligomers, reference is made to U.S. Pat. No. 4,644,053 (Brunelle et al.) which is incorporated by reference herein.

(i) Bischloroformates

The bischloroformate mixture employed in the preparation of the crude cyclics may be a mixture of substantially pure monomeric hydroquinone and bisphenol bischloroformates, which may be prepared, for example, by the reaction of the corresponding dihydroxyaromatic compound with phosgene in the presence of a dialkylaniline, as disclosed in British Patent 613,280, the disclosure of which is incorporated by reference herein.

For larger scale reactions, it is usually preferred for the sake of economy to employ crude bischloroformate mixtures which may contain oligomeric carbonate bischloroformates, a majority of said oligomeric materials having degrees of polymerization up to about 5. Numerous methods for preparing such crude bischloroformates are known; suitable methods are disclosed, for example, in the following U.S. Patents:

| | |
|---|---|
| 3,255,230 | 3,974,126 |
| 3,312,661 | 4,638,077 |
| 3,966,785 | |

The disclosures of these patents are also incorporated by reference herein.

A preferred method for preparing bischloroformate compositions useful in the preparation of crude cyclics is disclosed in copending, commonly owned application Ser. No. 07/299,572. It comprises passing phosgene into a mixture of water, a substantially inert, water-immiscible organic liquid, an alkali or alkaline earth metal hydroxide, and hydroquinone or a mixture of hydroquinone and bisphenol A containing at least about 40 mole percent hydroquinone; the ratio of moles of water to gram-atoms of alkali or alkaline earth metal hydroxide in said mixture being in the range of about 5.0–5.5:1.

(ii) Tertiary amines

The tertiary amines employed in the preparation of the crude cyclics ("tertiary" in this context denoting the absence of N—H bonds) generally comprise those which are oleophilic (i.e., which are soluble in and highly active in organic media, especially those used in the oligomer preparation method described herein). Reference is made, for example, to the tertiary amines disclosed in U.S. Pat. Nos. 4,217,438 and 4,368,315, the disclosures of which are also incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and the bischloroformates is essential for the formation of the crude cyclic mixture. For the most part, such amines contain at least about 6 and preferably about 6–14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is often preferred by reason of its particular availability, low cost, and effectiveness in the preparation of products containing low percentages of high polymers.

(iii) Aqueous base

Also employed in the preparation of the crude cyclics mixture is an aqueous alkali or alkaline earth metal hydroxide or carbonate solution (hereinafter sometimes "aqueous base"), such as lithium, sodium, potassium or calcium hydroxide or sodium or potassium carbonate. It is most often lithium, sodium or potassium hydroxide, with sodium hydroxide being preferred because of its availability and relatively low cost. The concentration of the solution is not critical and may be about 0.2–16M.

(iv) Non-polar solvent

The fourth essential component in the preparation of crude cyclics is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran. Methylene chloride is generally preferred.

To prepare the crude cyclic oligomer mixture according to the above-described method, the reagents are brought into contact under conditions whereby bischloroformates are maintained at low concentration, generally up to about 0.5 M. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformates, and optionally other reagents, are added gradually to a reaction vessel containing the organic liquid.

Although addition of bischloroformates neat (i.e., without solvents) is within the scope of this embodiment, it is frequently inconvenient because many bischloroformates are solids. Therefore, they are preferably added as a solution in a proportion of the organic liquid. The proportion of organic liquid used for this purpose is not critical; about 25–75% (by weight) of the total, and especially about 40–60%, is preferred.

The reaction temperature is generally in the range of about 0°–50° C. It is most often about 0°–40° C. and preferably 20–40° C.

The molar proportions of the reagents constitute another factor affecting yield and purity. For example, when the molar ratio of amine to bischloroformates is about 0.06–2.0:1 to 0.1–0.25:1 and that of base to bischloroformates is from about 1.4:1 to 2.5–3.1:1, a higher proportion of cyclic oligomers is obtained. In general, lower proportions of base (typically a molar ratio of about 1.4–2.0:1) are employed with a crude bischloroformate composition than with substantially pure monomer bischloroformates (about 2.75–3.1:1).

A factor of some importance is the concentration of available amine, which should be maintained at a level as constant as possible during the entire bischloroformate addition period. If all amine is present in the reaction vessel into which bischloroformates are introduced, its concentration steadily decreases, principally by dilution. On the other hand, if amine is introduced continuously or in equal increments during bischloroformate introduction, its available concentration is initially low and increases more or less steadily during the addition period. These fluctuations can result in a high and constantly varying proportion of "high polymer" in the product. Such high polymers are oligomers (linear or cyclic) having degrees of polymerization greater than about 30, and are generally not preferred.

It has been found advantageous to introduce the amine in one initial large portion, usually about 40–95% and preferably about 40–75% by weight of the total amount, followed by incremental or continuous addition of the balance thereof. By this procedure, the concentration of available amine is maintained at a fairly constant level in the organic phase during the entire addition period, and it is possible to minimize the proportion of high polymer in the product.

Under these conditions, it is usually advantageous for the reaction vessel to initially contain about 1–40% and preferably about 1–20% of total aqueous base. The balance thereof is also introduced continuously or incrementally.

In one embodiment, the pH of the reaction mixture is in the range of about 9–14 and preferably about 10–11. When bischloroformates (and optionally amine) are added to all of the aqueous base, on the other hand, the initial pH remains on the order of 14 during essentially the entire reaction period.

The linear oligomers (B) are recovered by conventional operations such as combining the crude cyclic mixture, as a solid or in solution, with a diluent which is a non-solvent for said linear oligomers (B). Illustrative non-solvents include ketones such as acetone and methyl isobutyl ketone and esters such as methyl acetate and ethyl acetate. Acetone is a particularly preferred non-solvent. Recovery of the oligomers (B) is normally effected by simply separating the same from the diluent by known methods such as vacuum filtration. Thus, in one embodiment the oligomers (B) are free from cyclic oligomers.

3. Polycarbonate Formation Catalysts

The polycarbonate formation catalysts (C) which can be used in the method of this invention include various bases (both Bronsted and Lewis) and Lewis acids. In general, the amount of catalyst used is about 0.01-1.0 mole percent based on the number of moles of carbonate structural units in the mixture of components. Basic catalysts are exemplified by lithium phenate, lithium salts or hydroxy-terminated polycarbonates, lithium 2,2,2-trifluoroethoxide, n-butyllithium and tetramethylammonium hydroxide. Also useful are various weakly basic salts such as sodium benzoate, lithium stearate and sodium salts of unsubstituted and substituted phenylacetic acids.

A particularly useful class of Lewis bases is disclosed in U.S. Pat. No. 4,605,731, the disclosure of which is incorporated by reference herein. It comprises numerous tetraarylborate salts, including lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium-tetraphenylborate, tetran-n-butylphosphonium tetraphenylborate and tetraphenylphosphonium tetraphenylborate. The preferred catalysts within this class are the tetra-n-alkylammonium and tetra-n-alkylphosphonium tetraphenylborates. In one embodiment, tetramethylammonium tetraphenylborate is used because of its high activity, relatively low cost and ease of preparation from tetramethylammonium hydroxide and an alkali metal tetraphenylborate. In another embodiment, tetra-n-butylammonium tetraphenylborate is employed in the practice of the present invention.

Representative Lewis acids useful as polycarbonate formation catalysts include dioctyltin oxide; triethanolaminetitanium isopropoxide; tetra(2-ethylhexyl) titanate; polyvalent metal chelates such as bisisopropoxytitanium bisacetylacetonate (commercially available under the trade name "Tyzor AA"), the bisisopropoxyaluminum salt of ethyl acetoacetate and various transition metal acetylacetonates; and unsubstituted and substituted phenylacetic acids.

4. Additives and/or Fillers

The polymeric compositions of the present invention may contain one or more additives and/or fillers of the types used in the polymer art. Such materials may be included in the polymer blends of the present invention to modify or to obtain desirable properties. Fillers such as glass powder, quartz products, graphite, metal powders, powders of high melting synthetic resins, natural fibers, glass fibers, metal fibers, and the like may generally be included in the polymer compositions in amounts up to about 25 percent by weight.

Typical additives may be employed for color, thermal, hydrolytic and ultraviolet stabilization of the polycarbonate compositions of the present invention in amounts up to about 2 percent by weight. Other additives such as mold release agents, pigments, flame retardants and the like may also be present.

5. Blending Techniques

The polymeric compositions of the present invention including the amorphous polycarbonate (A), the linear polycarbonate oligomer (B), and optional additives and/or fillers can be prepared by blending the components in the presence of polycarbonate formation catalyst (C) using techniques well-known to those skilled in the art. A blending method which results in the formation of an intimate blend of the components is required. Suitable procedures include solution blending and melt blending. A particularly useful procedure is to intimately mix the components using conventional mixing equipment such as a mill, a Banbury mixer, a Brabender Torque Rheometer, a single or twin screw extruder, continuous mixers, kneaders, etc. For example, the components may be intimately mixed in the form of granules and/or powder in a high shear mixer. One preferred process involves: (1) mixing powdered components (A), (B) and (C) at ambient temperature in a mixer; (2) drying the mixed powder at about 115° C.; and (3) melt blending the mixed powder in an extruder, to obtain the polymeric compositions of the present invention. "Intimate" mixing means that the mixture is prepared with sufficient mechanical shear and thermal energy to produce a dispersed phase which is finely divided and homogeneously dispersed in the continuous or principal phase.

Thus, in another of its aspects the present invention relates to methods for increasing the solvent and flammability resistance of amorphous polycarbonates which comprises blending at least one amorphous polycarbonate (A), with an effective amount of at least one linear polycarbonate oligomer (B) in the presence of at least one polycarbonate formation catalyst (C). An effective amount of oligomer (B) is usually at least about 20 percent by weight, and may be up to about 60 percent by weight or more. The polycarbonate formation catalyst is generally employed in an amount of at least about 0.01 mole percent based on the number of carbonate structural units in the blended mixture. The polymeric compositions of the present invention are characterized as having improved flame and solvent resistance with little or no reduction in impact strength.

The polymeric compositions of the present invention can be processed into shaped articles by extrusion, coextrusion, thermo-forming, blow-molding, injection-molding, compression-molding, calendering, laminating, stamping, pultrusion, etc. In particular, shaped articles can be prepared by injection molding the polymeric compositions of the present invention.

EXAMPLES

Various features and aspects of the present invention are illustrated further in the examples that follow. While these examples are presented to show one skilled in the art how to operate within the scope of this invention, the examples are not to serve as a limitation on the scope of the invention since such scope is only defined in the claims.

Unless otherwise indicated in the following examples and elsewhere in the specification and claims, all percentages are by weight, all temperatures are in degrees Centigrade and if not specified are ambient temperature, and all pressures are at or near atmospheric.

1. Preparation of Bischloroformates.

Example 1

A 30 liter reactor was charged with 12.5 liters of $CH_2Cl_2$, 752.4 grams of hydroquinone (6.84 moles) and 1176.5 grams of bisphenol A (5.16 moles). Phosgene was added at the fastest possible rate such that 2500 grams were delivered in close to one hour. The reaction contained no initial water and the reactor was maintained with the best possible stirring. During the phosgenation reaction, the stoichiometric amount of sodium hydroxide (24 moles; 1920 grams of 50% NaOH) was added subsurface. Following completion of the NaOH and phosgene addition, the reaction was pH controlled at pH=3-5, for ½ hour. Following this half hour, four liters of water were added, the pH was raised to 8 and the temperature was maintained below 20° C., until no phosgene was detected. The organic layer was then washed with 1N HCl, and was used directly in the preparation of crude cyclics. Derivatization and hplc analysis indicated that the yield of hydroquinone bischloroformate was 44%, with about 20% dimeric bischloroformate present.

Example 2

A 30 liter reactor was charged with 660 grams of hydroquinone (6 moles), 136 grams of bisphenol A (6 moles), and 8.2 liters of $CH_2Cl$. The reactor was stirred while cooling to 10°-15° C. for about 10 minutes, then phosgene was admitted at a rate of 36 g/min for 67 minutes (24.0 moles). Concomitant to the phosgenation, a methylene chloride slurry consisting of 933 grams of calcium hydroxide (12.6 moles) and 1.3 liters of $CH_2Cl_2$ was added. Water was also added continuously at a rate of 18 ml/min (1.2 liters total). The reaction temperature was maintained between 15 and 18° C. Following completion of the phosgenation, the reaction was stirred for 30 minutes, while purging with nitrogen. At that time, about 2.4 liters of water was added, and 50% NaOH was added, while maintaining the pH at 8, until phosgene could no longer be detected in the reactor. Finally, the phases were separated, and the organic phase was washed with 0.1 M HCl. Derivatization and analysis of the reaction product indicated 68% of theoretical hydroquinone bischloroformate and 79% of theoretical bisphenol A bischloroformate. The mixture was used in the cyclization reaction without further purification.

2. Preparation of Crude Cyclic Carbonates

Example 3

The bischloroformate solution (nominal concentration =0.6 M) prepared in Example 1 (20 liters) was placed in a pressure vessel and weighed, so that addition over 30 minutes with constant flow was achieved. The reactor was charged with 20 liters of $CH_2Cl_2$, 240 m of $Et_3N$, and one liter of water. The reactor was brought to reflux, while stirring, and at that point addition with base was started. After approximately 2% of the base was added, bischloroformate addition was started, and addition continued over 30 minutes. Concomitant to bischloroformate addition, an additional portion of $Et_3N$ (240 ml) was added (over 30 minutes), and 30% NaOH was added to maintain the pH at 9.5-11 (normally 1.2 moles of base/liter of bischloroformate solution is necessary). After the addition was complete, 5 liters of water were added, followed by 5 liters of 1.0 M HCl. The phases were separated, and the organic phase was washed sequentially with 1 N HCl, 0.1 N HCl, and water (three water washes). The product (crude HQ-BPA cyclics containing linear oligomeric material) was isolated by pumping the $CH_2Cl_2$ solution into boiling water, leaving an off-white powder, which was removed by filtration and was dried.

3. Isolation of Linear Oligomeric Polycarbonate

Example 4

The linear oligomeric hydroquinone-BPA carbonate was obtained as follows. A total of 3166.8 grams of crude HQ-BPA cyclic carbonate from example 3 was divided into ten lots. Each of these lots was stirred rapidly with 3.5 L of acetone in a Waring blender for about 5 minutes; the mixture was then vacuum filtered. The residues were combined and treated similarly with acetone two more times. After drying in a vacuum oven, the final residue (i.e., the linear oligomeric hydroquinone-BPA carbonate) weighed 1511.1 g., corresponding to 47.7% of the crude cyclics. (The yield of purified cyclics was 1655.7 g., corresponding to 52.3% of the crude cyclics.) GPC analysis (in 1,2,4-trichlorobenzene at 150° C.) of the oligomeric material revealed the $M_w$ to be 5394 and the $M_n$ to be 2006 (relative to polystyrene). In all cases, the molar ratio of hydroquinone to BPA was 65:35.

4. Preparation of Polymer Blends

Examples 5-11

In a Henschel mixer were placed 750 g. of BPA polycarbonate ("BPA PC") resin ($M_n$=28,000 relative to polystyrene), 750 grams of linear oligomeric hydroquinone-BPA carbonate obtained in Example 4, and 0.1 mole percent (based on the total number of bisphenol carbonate units present) of tetra-n-butylammonium tetraphenylborate ("borate"). This formulation was mixed for 30 seconds. Also prepared were mixtures comprised of 25 and 10 weight percent HQ-BPA oligomeric carbonate. Similar mixtures were also prepared from 50, 25 and 10 weight percent HQ-BPA oligomeric carbonate, but without borate catalyst. These mixtures, along with a control batch of 100 percent BPA polycarbonate resin ($M_n$=28,000) relative to polystyrene), were then dried in an air circulating oven at 115° C. for several hours prior to melt blending, which was achieved on a Werner and Pfleiderer, WP-28 twin screw extruder having six heating zones. The feeder rate was reduced for borate containing batches having greater than 10 weight percent oligomer in order to keep the extruder from "torquing out" Table 1 presents the details for the extrusions of each of these materials.

TABLE 1

| | EXTRUSION OF BLENDS OF BPA POLYCARBONATE AND LINEAR OLIGOMERIC HQ-BPA CARBONATE | | | | | | | | | | |
|---|---|---|---|---|---|---|---|---|---|---|---|
| EX. | WT % BPA PC | MOLE % BORATE | FEEDER RATE | TORQ(%) | CURR(AMPS)* | T-1 | T-2 | T-3 | T-4 | T-5 | T-DIE |
| 5 | 100 | — | 600 | 69 | 11.8 | 327 | 593 | 625 | 576 | 583 | 584 |
| 6 | 50 | 0.1 | 370 | 77 | 13.3 | 324 | 571 | 656 | 575 | 597 | 586 |
| 7 | 75 | 0.1 | 400 | 77 | 13.0 | 322 | 573 | 650 | 576 | 596 | 587 |
| 8 | 90 | 0.1 | 600 | 82 | 14.3 | 312 | 552 | 647 | 574 | 599 | 587 |

TABLE 1-continued

EXTRUSION OF BLENDS OF BPA POLYCARBONATE AND LINEAR OLIGOMERIC HQ-BPA CARBONATE

| EX. | WT % BPA PC | MOLE % BORATE | FEEDER RATE | TORQ(%) | CURR(AMPS)* | T-1 | T-2 | T-3 | T-4 | T-5 | T-DIE |
|---|---|---|---|---|---|---|---|---|---|---|---|
| 9 | 50 | — | 600 | 93 | 16.5 | 319 | 554 | 636 | 575 | 597 | 586 |
| 10 | 75 | — | 600 | 84 | 14.5 | 316 | 575 | 646 | 576 | 596 | 586 |
| 11 | 90 | — | 600 | 72 | 12.5 | 309 | 580 | 639 | 575 | 589 | 584 |

T-1, T-2, T-3, etc. give the extruder zone temperatures in degrees F.
*current required to maintain screw speed.

5. Evaluation of Blends

Examples 12-18

Prior to molding, the extrudate materials from examples 5-11 were dried in an air circulating oven at 250° F overnight. The extrudates were then injection molded into test bars on an 85 ton Van Dorn molding machine using the following conditions: the mold temperature was 180° F, the extruder barrel set temperature was 570° F, the injection pressure was 400 psi, and the back pressure was about 100 psi. The test bars obtained were 0.125 inch thick Izod bars, flame bars, and tensile bars.

Evaluation of the materials for resistance to acetone was accomplished by clamping a 2½" long Izod test bar to a curved stainless steel stress jig (6¼" radius, which imposed a 1 percent applied strain on the bar). This assembly was then immersed in a jar of acetone for 10 minutes. The test was carried out three times for each extrudate material. The materials were also evaluated for notched Izod impact strength, and melt viscosity. Table 2 summarizes the pertinent results.

TABLE 2

EVALUATION OF BLENDS OF BPA POLYCARBONATE AND LINEAR OLIGOMERIC HQ-BPA CARBONATES

| EX. | WT % BPA PC | MOLE % BORATE | MI[1] | KI[2] | NI[3] | BEHAVIOR IN ACETONE |
|---|---|---|---|---|---|---|
| 12 | 100 | — | 11.6 | 2,660 | 16.5 | instantaneously cracked |
| 13 | 50 | 0.1 | 0.6 | 11,330 | 14.1[4] | all bars remained intact |
| 14 | 75 | 0.1 | 3.5 | 6,300 | — | not tested |
| 15 | 90 | 0.1 | 5.9 | 4,660 | — | not tested |
| 16 | 50 | — | 0.7 | 7,045 | 4.7 | all bars remained intact |
| 17 | 75 | — | 7.2 | 3,055 | 16.2 | only 1 of 3 bars cracked |
| 18 | 90 | — | 12.3 | 1,970 | 16.0 | instantaneously cracked |

[1] melt flow index (g/10 min) ASTM D 1238
[2] Kasha index
[3] notched Izod (ft-lbs/inch of notch) ASTM D 256
[4] based on average of 2 of the 3 bars; the third bar had a value of 4.1

The melt viscosity as measured by both melt index (MI) and Kasha index (KI) increased as more of the oligomeric hydroquinone-BPA carbonate was employed. This is unexpected since the oligomeric material itself has a melt viscosity that is too low to measure by the MI and KI procedures.

As can be seen, utilization of the "borate" produces materials that exhibit a notched Izod value of about 14.1 ft-lbs/inch of notch, a value typical of BPA-polycarbonate resins. As pointed out in the footnote of Table 2, this value is based on only 2 of the 3 bars; the third bar had a value of 4.1. Thus, the "borate" system has yielded a significant improvement in notched Izod impact strength relative to the system not containing "borate" while maintaining the excellent resistance to acetone (the notched Izod value for the three bars is 10.6 ft-lbs/inch of notch).

Examples 19-25

The test parts molded in Examples 12-18 were evaluated for resistance to gasoline. A 2½" long Izod bar was clamped to a curved stainless steel stress jig having a radius sufficient to impose a 0.6 percent strain (a 6¼" radius will impose a 1 percent strain). This assembly was then immersed in a jar of gasoline for five minutes. The test was carried out three times for each material. The materials were also evaluated for impact strength after immersion. Table 3 summarizes the pertinent results.

TABLE 3

RESULTS FOR EXPOSURE OF VARIOUS MATERIALS TO GASOLINE

| EX. | WT % BPA PC | MOLE % BORATE | NI | BEHAVIOR IN GASOLINE |
|---|---|---|---|---|
| 19 | 100 | — | 0.4 | all bars showed severe crazing |
| 20 | 50 | 0.1 | — | all bars developed only one major craze which allowed parts to buckle, but did not cause the parts to crack in separate pieces |
| 21 | 75 | 0.1 | 0.9 | all bars showed moderate crazing; none of the bars cracked |
| 22 | 90 | 0.1 | 0.8 | all bars showed moderate crazing; none of the bars cracked |
| 23 | 50 | — | — | all bars cracked after 30-60 seconds |
| 24 | 75 | — | — | all bars cracked after 1 minute |
| 25 | 90 | — | — | all bars cracked after 2-3 minutes |

Examples 26-29

The test bars molded in Examples 12-15 were evaluated for flammability resistance. Table 4 summarizes the pertinent results.

TABLE 4

FLAME RESISTANCE EVALUATION OF VARIOUS MATERIALS

| EX. | WT % BPA PC | MOLE % BORATE | OI[1] | UL-94 | % CHAR[2] |
|---|---|---|---|---|---|
| 26 | 100 | — | 25 | Failed | 21.3 |
| 27 | 50 | 0.1 | 32 | V-O | 18.5 |
| 28 | 75 | 0.1 | 35 | V-O | 18.8 |

TABLE 4-continued

FLAME RESISTANCE EVALUATION OF VARIOUS MATERIALS

| EX. | WT % BPA PC | MOLE % BORATE | OI[1] | UL-94 | % CHAR[2] |
|---|---|---|---|---|---|
| 29 | 90 | 0.1 | 35 | V-O | 19.8 |

[1]oxygen index - ASTM D 2863
[2]wt % relative to test bar before char.

Although the above examples are limited to only a few of the variables applicable to the compositions and methods within the scope of the present invention, it should be understood that the scope of the present invention can be further appreciated by the description preceding these examples. Therefore, it is to be understood that the invention disclosed herein is intended to cover such modifications as fall within the scope of the appended claims.

What is claimed is:

1. A mixture comprising:
   (A) at least one amorphous linear polycarbonate having a weight average molecular weight, as determined by gel permeation chromatography, in the range of about 20,000–80,000;
   (B) a linear polycarbonate oligomer mixture comprising a major proportion of oligomers having degrees of polymerization from 3 to about 30 and containing hydroquinone carbonate structural units; and
   (C) at least one catalyst for conversion of cyclic polycarbonates to linear polycarbonates.

2. A mixture comprising:
   (A) an amount up to about 80 percent by weight of at least one amorphous linear polycarbonate having a weight average molecular weight, as determined by gel permeation chromatography, in the range of about 20,000–80,000;
   (B) at least about 20 percent by weight of a linear polycarbonate oligomer mixture comprising a major proportion of oligomers having degrees of polymerization from 3 to about 30 and comprising carbonate structural units of the following formulae (I) and (II):

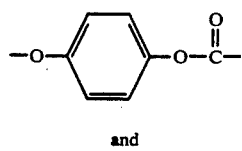

and

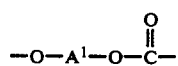

wherein in formula (II) A[1] is a divalent group represented by the following formulae (III) or (IV):

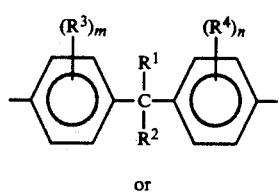

or

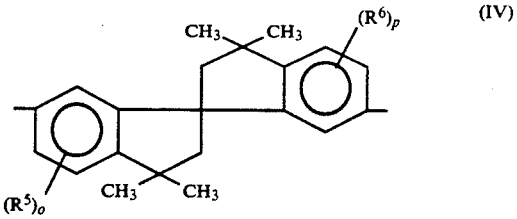

wherein in formula (III) each of R[1] and R[2] independently is a linear or branched alkyl group, and in formulae (III) and (IV) each R[3], R[4], R[5] and R[6] independently is a linear or branched alkyl group, or is a halogen atom., m and n independently are 0–4 and o and p independently are 0–3; and wherein at least about 30 mole percent of the carbonate structural units in said oligomers have formula (I); and
   (C) at least about 0.01 mole percent based on the moles of carbonate units in the mixture of at least one catalyst for conversion of cyclic polycarbonates to linear polycarbonates.

3. A composition according to claim 2 wherein component (B) contains at least about 60 mole percent of units of formula (I).

4. A composition according to claim 3 wherein component (B) contains about 65 mole percent of units of formula (I).

5. A composition according to claim 2 wherein component (A) comprises homopolycarbonates, copolycarbonates, or copolyestercarbonates.

6. A composition according to claim 5 wherein component (A) comprises BPA polycarbonates.

7. A composition according to claim 2 wherein A[1] has formula (III).

8. A composition according to claim 7 wherein m and n are 0.

9. A composition according to claim 8 wherein R[1] and R[2] are methyl.

10. A composition according to claim 2 wherein A[1] has formula (IV).

11. A composition according to claim 9 wherein o and p are 0.

12. A composition according to claim 2 wherein component (C) comprises a tetra-n-alkylammonium or a tetra-n-alkylphosphonium tetraphenylborate.

13. A composition according to claim 11 wherein component (C) comprises about 0.1 mole percent of tetra-n-butylammonium tetraphenylborate or tetramethylammonium tetraphenylborate.

14. A composition according to claim 2 wherein component (A) comprises up to about 80 percent by weight of at least one amorphous polycarbonate consisting essentially of structural units of the following formula (V):

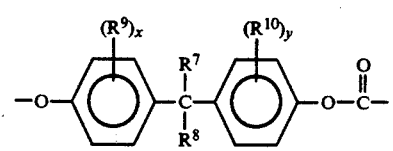

wherein each of R[7] and R[8] independently is a linear or branched alkyl group, each R[9] and R[10] independently is a linear or branched alkyl group, or is a halogen atom, and x and y independently are 0–4.

15. A mixture comprising:
(A) an amount up to about 80 percent by weight of an amorphous linear polycarbonate having a weight average molecular weight, as determined by gel permeation chromatography, in the range of about 20,000–80,000, consisting essentially of carbonate structural units of the following formula (V):

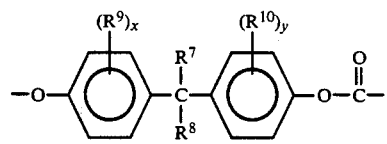

wherein each of $R^7$ and $R^8$ independently is a linear or branched alkyl group, each $R^9$ and $R^{10}$ independently is a linear or branched alkyl group, or is a halogen atom, and x and y independently are 0–4;

(B) at least about 20 percent by weight of a linear polycarbonate oligomer mixture comprising a major proportion of oligomers having degrees of polymerization from 3 to about 30 and consisting essentially of carbonate structural units of the following formulae (I) and (II);

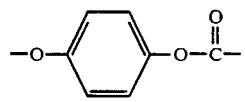

and

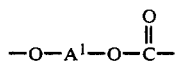

wherein in formula (II) $A^1$ is a divalent group represented by the following formula (III):

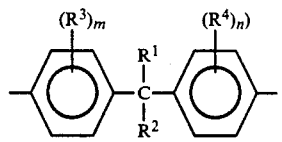

wherein formula (III) each of $R^1$ and $R^2$ independently is a linear or branched alkyl group, each $R^3$ and $R^4$ independently is a linear or branched alkyl group, or is a halogen atom, and m and n independently are 0–4; and wherein about 65 mole percent of the carbonate structural units in said oligomers have formula (I); and (C) at least about 0.01 mole percent based on the moles of carbonate units in the mixture of a catalyst for conversion of cyclic polycarbonates to linear polycarbonates comprising a tetra-n-alkylammonium tetraphenylborate.

16. A method for increasing the solvent resistance of an amorphous linear polycarbonate having a weight average molecular weight, as determined by gel permeation chromatography, in the range of about 20,000–80,000, which comprises melt blending said amorphous polycarbonate, in the presence of a catalyst for conversion of cyclic polycarbonates to linear polycarbonates, with an effective amount of a linear polycarbonate oligomer mixture comprising a major proportion of oligomers having degrees of polymerization from 3 to about 30 and comprising carbonate structural units of the following formulae (I) and (II):

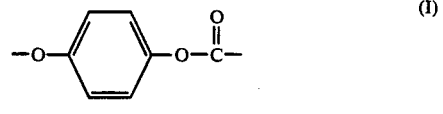

and

wherein in formula (II) $A^1$ is a divalent group represented by the following formulae (III) or (IV):

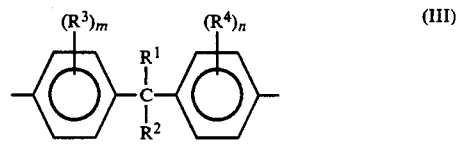

or

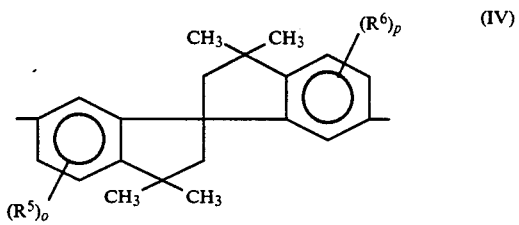

wherein in formula (III) each of $R^1$ and $R^2$ independently is a linear or branched alkyl group, and in formulae (III) and (IV) each $R^3$, $R^4$, $R^5$ and $R^6$ independently is a linear or branched alkyl group, or is a halogen atom, m and n independently are 0–4 and o and p independently are 0–3; and wherein at least about 30 mole percent of the carbonate structural units in said oligomers have formula (I).

17. A method according to claim 16 wherein said solvent comprises acetone.

18. A method according to claim 16 wherein said solvent comprises gasoline.

19. A method for increasing the flammability resistance of an amorphous linear polycarbonate having a weight average molecular weight, as determined by gel permeation chromatography, in the range of about 20,000–80,000, which comprises blending said amorphous polycarbonate, in the presence of a catalyst for conversion of cyclic polycarbonates to linear polycarbonates, with an effective amount of a linear polycarbonate oligomer mixture comprising a major proportion of oligomers having degrees of polymerization from 3 to about 30 and comprising carbonate structural units of the following formulae (I) and (II):

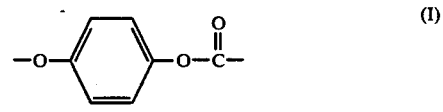

and

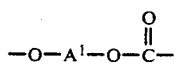 (II)

$$-O-A^1-O-\overset{O}{\overset{\|}{C}}-$$

wherein in formula (II) $A^1$ is a divalent group represented by the following formulae (III) or (IV):

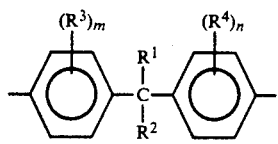 (III)

or

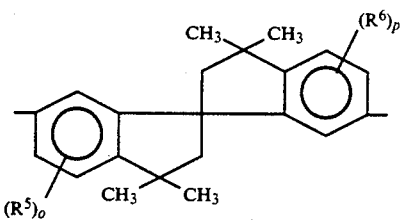 (IV)

wherein in formula (III) each of $R^1$ and $R^2$ independently is a linear or branched alkyl group, and in formulae (III) and (IV) each $R^3$, $R^4$, $R^5$ and $R^6$ independently is a linear or branched alkyl group, or is a halogen atom, m and n independently are 0–4 and o and p independently are 0–3; and wherein at least about 30 mole percent of the carbonate structural units in said oligomers have formula (I).

* * * * *